United States Patent [19]

Neumann

[11] 4,244,665
[45] Jan. 13, 1981

[54] STRUCTURAL ELEMENT SYSTEM

[76] Inventor: Herwig Neumann, Herrenberger Str. 39, 7031 Hildrizhausen, Fed. Rep. of Germany

[21] Appl. No.: 899,399

[22] Filed: Apr. 24, 1978

Related U.S. Application Data

[63] Continuation-in-part of Ser. No. 682,014, Apr. 30, 1976, abandoned.

[30] Foreign Application Priority Data

Apr. 25, 1977 [DE] Fed. Rep. of Germany ....... 2718290

[51] Int. Cl.³ ............................................ E02D 29/02
[52] U.S. Cl. ........................................ 405/286; 47/83
[58] Field of Search .................. 47/83, 34; 52/27, 36, 52/292, 169.4; 405/286

[56] References Cited

U.S. PATENT DOCUMENTS

| 2,514,536 | 7/1950 | Burney | 47/34 |
| 3,374,574 | 3/1968 | Haile | 47/83 |

FOREIGN PATENT DOCUMENTS

| 2360104 | 8/1974 | Fed. Rep. of Germany | 405/286 |
| 4781 | of 1905 | United Kingdom | 52/27 |

Primary Examiner—John E. Murtagh
Attorney, Agent, or Firm—Shlesinger, Arkwright, Garvey and Dinsmore

[57] ABSTRACT

A structural element system comprising substantially L-shaped longitudinal elements arranged in multi-level relationship having a horizontally extending base plate portion and an upwardly extending parapet element, and sectional support elements acting as vertical spacers for the longitudinal elements extending perpendicular to the direction of the longitudinal elements, the sectional supports having upper and lower mounting surfaces and adopted for engagement by the base plate portions of the longitudinal elements to provide a wall capable of dividing shearing forces acting on the wall vertically and longitudinally so that the wall stands erect, retaining a slope surface and provides areas for the accommodation of plants, small foliage or the like.

15 Claims, 16 Drawing Figures

STRUCTURAL ELEMENT SYSTEM

This application is a continuation-in-part of Application Ser. No. 682,014 filed Apr. 30, 1976, now abandoned.

The main U.S. Pat. Ser. No. 682,014, Apr. 30, 1976, relates to a structural element system for production of walls or slope shorings with planters, in which supports arranged transverse to the direction of the wall are set up one over the other as vertical spacers between longitudinal members having parapet elements and forming individual planter levels, in which the longitudinal members include nearly upright parapet elements and horizontal base plates, which rest on the bottom support and are covered and maintained by the next higher support.

With this known system of prefabricated concrete structural elements, walls or partitions for slope shoring, formation of an enclosure, or sound insulation can be optically broken up and also can serve as planters, because the prefabricated structural elements are small and light enought to transport and handle. Walls can be built which can contain planters, can be vertical if desired, or inclined if desired, and be made of these simple elements.

The present invention relates to further developments and improvements on the aforementioned structural element system with the purpose of simplification of mounting of the structural elements and fitting the system to a large number of requirements, such as the capacity to sustain large slope stress forces with higher retaining walls, or to provide vertical retaining walls which can also serve as planters, or for adaption of a sound insulation wall with a planter to certain sound reflection angles.

The support elements erected to serve as vertical spacers are mounted directly one over another on foundations, so that the stacks of supports form transverse walls extending into the earth of the slope to be stored, so that the slope pressure forces in the intervals between adjacent stacks of supports are absorbed in increments over the longitudinal elements resting on the supports at the front and are conducted back over the supports in vertical direction to the foundation and into the ground.

The concrete supports are in a position, on the basis of their gravity and the load, through the longitudinal elements and the forces of the weight of the earth which are working on them, as well as also on the basis of the friction joint working between the support elements, to assume all of the slope stress forces.

With higher retaining walls, the bottom support elements which are projecting into the slope can be of greater length than the top support elements. The forces to be absorbed by the supports are consigned primarily to the longitudinal elements, which distribute the heavy horizontal slope stress forces in increments on smaller sections of the members. The rectangular, pointed or blunt angle of the longitudinal element has the advantage of providing considerable inherent rigidity, so that, if necessary, even greater intervals between adjacent supports elements are bridged.

The longitudinal elements which their shorter horizontal base plates are fitted or forced from the front or from above into clearances or recesses in the framework elements, whereupon the planter levels are filled up with earth and so forth. The horizontal alignment of the longitudinal elements is simplified since the longitudinal elements can be removed from the support elements by sliding out and can be reset on one or more support element stacks after correction of the alignment.

Although the planter levels can also be lower than the normal support height, larger intervals between levels than the height of a parapet element are customarily preferred, but the height if finally determined by the size of the slope stress forces to be absorbed. But the supports, for simpler production and handling, are preferably of lower height than the height for the planter levels. The height of the support element can correspond to half of or a smaller division of the height between contacts. With the lightness of the individual elements and the thereby simplified mounting, the stability of the stakcs of support elements remains unimpaired, and particularly with very long longitudinal elements the support element stacks can be of reduced cost, if the ends of adjacent longitudinal elements are overlapped or are displaced within a plant level to half or some other subdivision of the elevation measure. The longitudinal elements which are usually connected longitudinally to each other are now staggered in elevation, so that the facade is broken up and now fits the curves of the land. Also, the base plate of each longitudinal element lies entirely on one support element, so that the bearing forces which are created here cause no excessive surface pressure.

The slope shoring or longitudinal elements distribute the slope stress forces to the individual levels and buttress the front broken surface part of the ground of the slope at the individual levels. With sound insulation walls it can be advantageous to provide the longitudinal elements with a large base plate, in order to enlarge the open planting surface by an angle of slope similar to the ground and thus to enhance the sound absorption capacity.

In the space between two adjacent support element stacks, shiftings of the earth and slope stress forces remain within controllable limitations. With entirely horizontal smooth top surfaces of the support, a wall can be embodied at any incline, even vertical. With support elements of uniform height, a steeper incline angle depends on cost of the available planter and exposure surface. A planter can still be provided if a greater support height is possible.

Different solutions, according to the height of the retaining walls being produced, are offered for binding the longitudinal elements together. With lower elements up to ca. 3 m, the friction joint extends between the base plate of the longitudinal element and the support lying thereunder, in order to support the incrementally distributed horizontal slope stress forces.

With a greater height, up to for example 6 m, it can be necessary to affix the longitudinal elements against a flange is formed on the support lying thereunder. The relevant support lies with its entire buttomside on the support lying thereunder and is affixed by its specific gravity and friction lock.

With still greater heights, the effective friction lock is no longer sufficiently sure, so that a support guaranteeing a form locking between the front top and the rear bottom flange is used, whereby the top support with its bottom flange covers and maintains the support lying thereunder. With another embodiment, the topside and the bottomside of the support element run flant all the way through while a recess is provided on the front, onto which is inserted the base plate of the longitudinal element. The recess is bordered at the front by a flange.

The invention is clarified hereinafter relative to the embodiments shown in the drawing.

Figure 1:
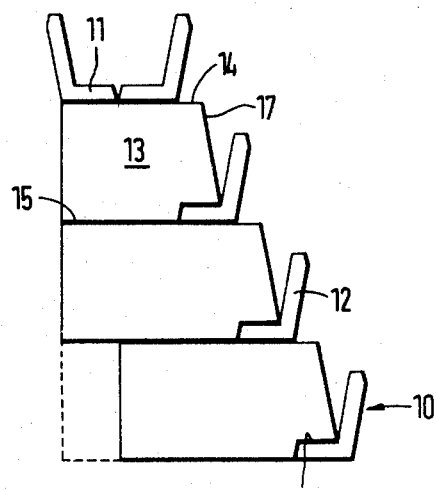
FIGS. 1-4 show side and perspective views of the known system as in the main patent.

Longitudinal elements 10 consist of a planter base plate 11 and a blunt, rectangular or sharp angled attached parapet element 12. Base plate 11 lies on supports 13, which have horizontal mounting surfaces 14, 15 and are sandwiched in stacks. Parapet parts 12 form the front of the wall and are attached to base plates 11 to enlarge the planting surface by their angle of attachment and make steep or even vertical planter walls possible.

Supports 13 can have different standard lengths, in order to make a deeper mounting in the slope at the lower levels possible. The stacked support elements 13, as seen from the front, form bulkheads distributed over the length of the wall and separated from each other, in which the pressure of the earth coming from the slope is distributed in controllable increments, and is consigned to each bulkhead by the longitudinal elements.

Figure 3:
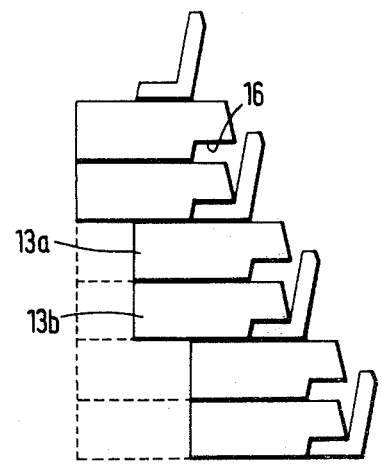
Figure 2:
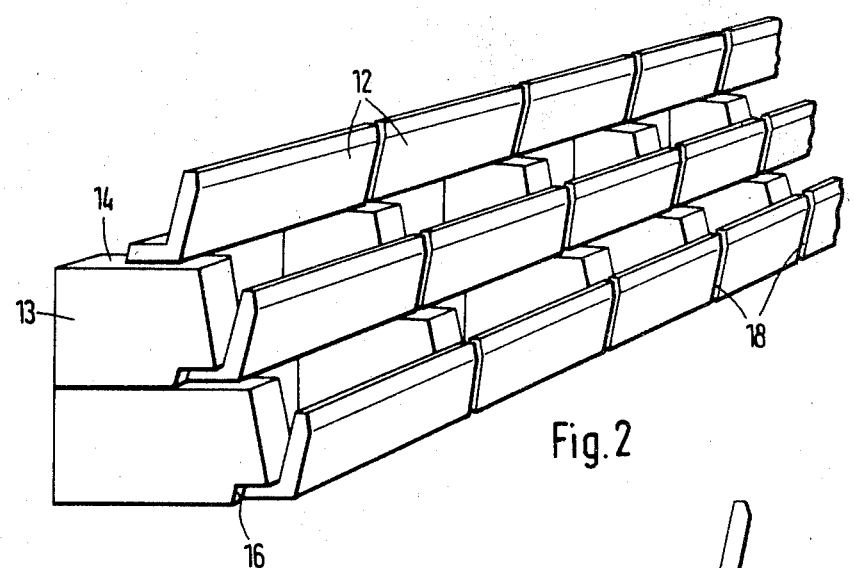

The front 17 of supports 13 is preferably inclined as in FIGS. 1-3, so that the same support elements can be used for parapet parts with the same incline. With front surfaces 17 tilted forward as in FIG. 4, steeper walls are erected, because the longitudinal elements in this case can be arranged farther forward on the top surface 14 of the support.

Figure 7:
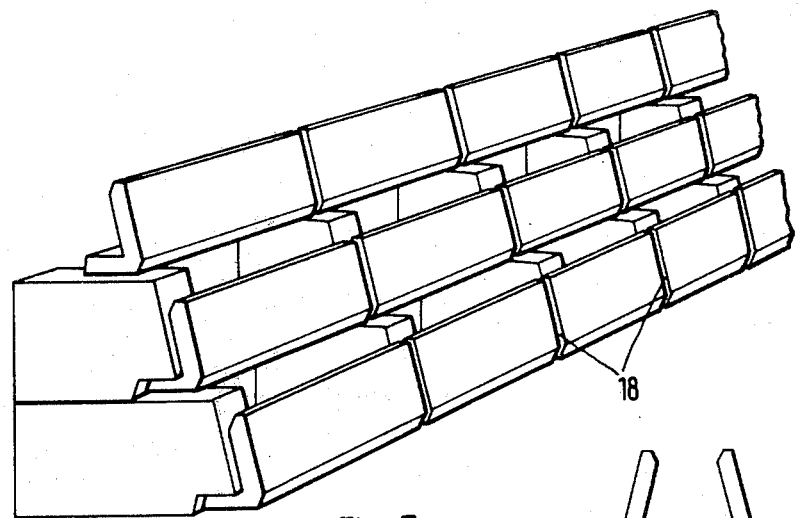

FIGS. 2 and 7 show each two longitudinal elements 10 subsequent to each other with their base plates 11 as they can be mounted on the mounting surface 14 of a support 13 lying thereunder, whereby the support element is sufficiently broad to allow for broad seams 18. Seams 18 are basically provided to preclude longitudinal movements of stresses between adjacent longitudinal elements with settling of the earth, and also to guarantee runoff for slope water and continuity of the upright structural entity, if curved slopes are being supported with straight longitudinal elements.

Supports 13 preferably include a bottom recess 16 which is open to the front, of which the height corresponds approximately to the thickness of the base plate 11 of the longitudinal elements, so that each base plate 11 is covered and maintained by the next higher support element 13. The longitudinal elements are shoved with their base plates 11 into recesses 16 after of during erection of the support element stacks. Base plate 11 is shorter than parapet part 12. Recesses 16 of support elements 13 have no stress support function, because the weight of longitudinal element 10 is consigned over its base plate 11 downward onto the support lying thereunder, and the design of the longitudinal element is much that even with planters filled with earth, no forces impact sufficiently strongly on parapet 12 to produce a notable torque moment.

Figure 13:
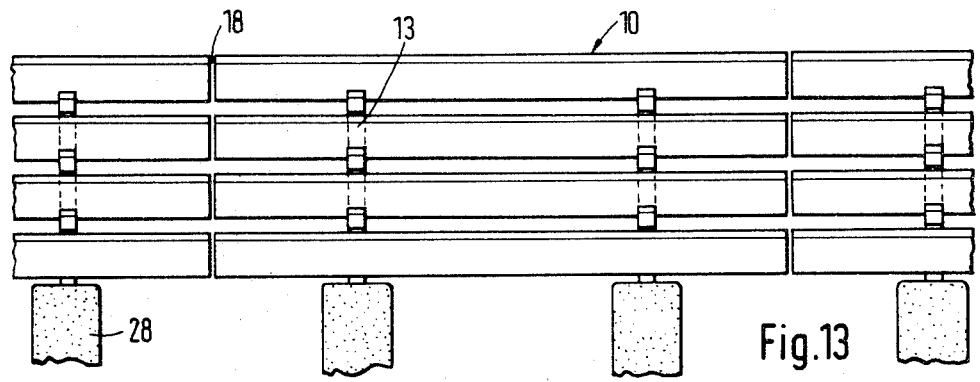
FIG. 13 shows a view of a retaining wall similar to FIG. 12, but with stacks of support elements of larger contact height lying close together.

FIG. 13 shows support elements 13a, 13b, with recesses 16, stacked one over the other to the desired height. It is basically possible to use these smaller supports 13a, 13b, either individually as supports and vertical spacers for longitudinal elements or for a planter, or else for retaining walls with remarkably smooth inclines, e.g. of 45°.

Figure 12:
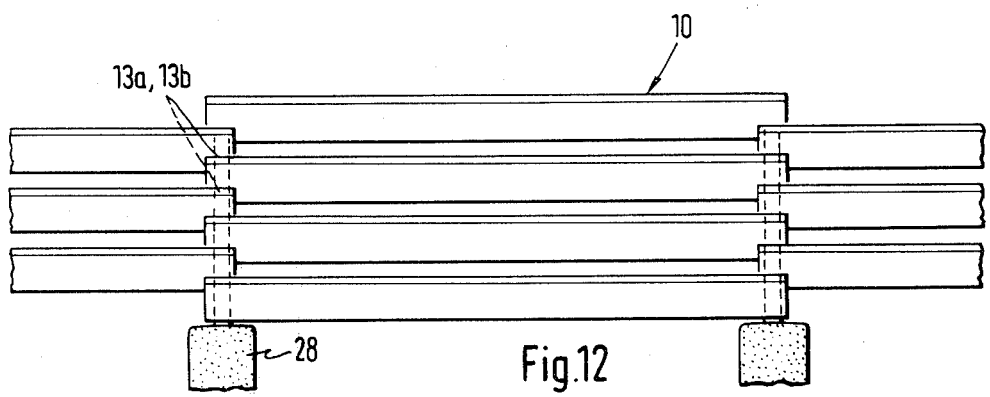
FIG. 12 shows a view of a retaining wall with large longitudinal elements with use of support element stacks as in FIGS. 3 or 15 and 16.

With only one stack of support elements 13a, 13b, in FIG. 12, entire stacks of supports can be economized, particularly if longitudinal elements 10 are staggered in contact on each stack of support elements. The stability of the retaining wall is retained, since the full width of a support element lying thereunder is available as support for each longitudinal element 10. The low support elements as in FIG. 3 also provide a simple adaptation of the retaining wall to slight rises of the land.

Figure 4:
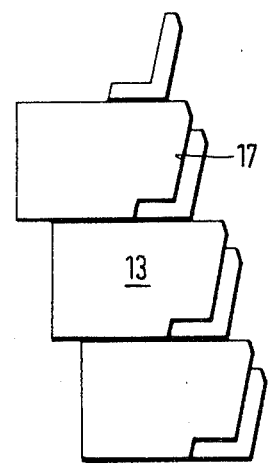
Figure 5:
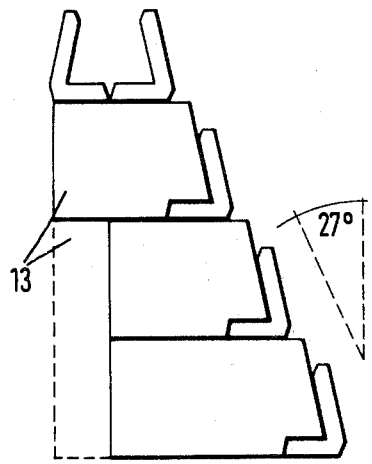
FIGS. 5, 6, 7 show side views or perspectives of a retaining wall with longitudinal elements with acute angles in the transverse cross section.
Figure 6:
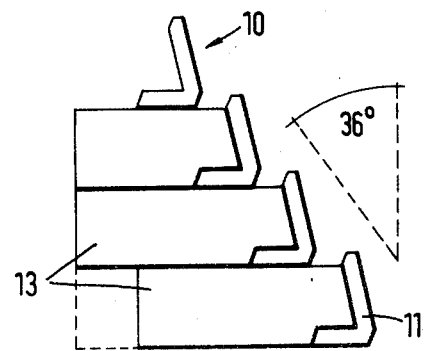

In FIG. 13, support elements 13, e.g. as in FIG. 1 or 4 or even FIG. 3, are stacked on foundations 28, lying very close together, as in FIG. 12. This arrangement is advantageous with long longitudinal elements 10, if the slope shoring runs along a rise or on some other uneven plane, because it has as many as two support element stacks per length of one longitudinal element 10. Since the longitudinal elements are supported with short open spaces, they need only a weak reinforcement, This arrangment is less sensitive to local foundation differences, i.e. the distances between foundations 28 need not be maintained so exact as with the arrangement in FIG. 12.

Figure 8:
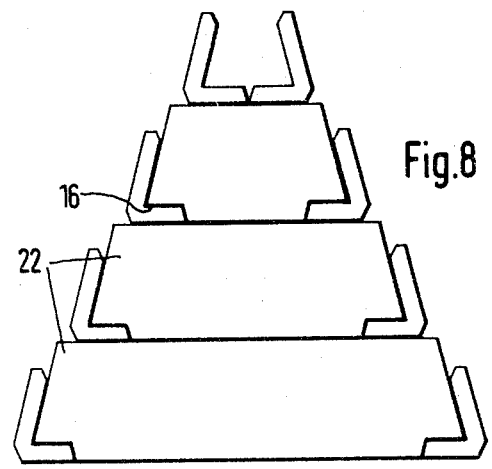
FIGS. 8, 9 show side views of a freestanding wall as camouflage or sound insulation wall.
Figure 9:
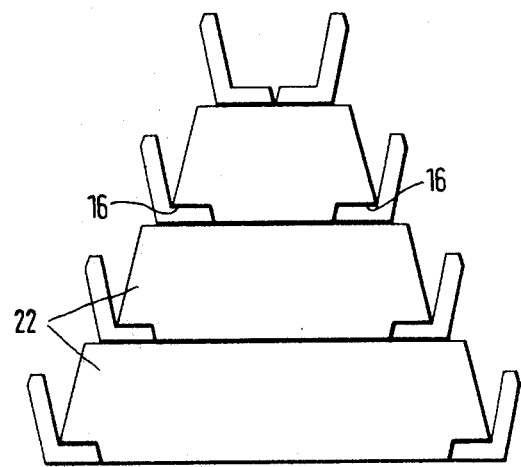

FIGS. 8 and 9 show a sound insulation wall which is constructed of traditional longitudinal elements 10 with support elements 22, with bottom recesses 16 on both sides and of different lengths, for the formation of the individual levels which are smaller as they progress upward, which lengths are determined with construction of the height and the angle of slope of the insulation wall.

Figure 10:
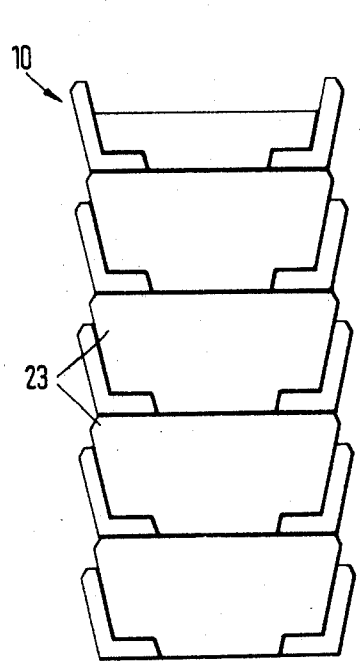
FIG. 10 shows a side view of a freestanding planter wall with vertical walls.

A camouflage wall or sound insulation wall which is of the same width over its entire height, but also is a planter, as in FIG. 10, is constructed of traditional longitudinal elements 10 and supports 23 of the same length, which also have bottom front recesses 16, with which the base plates of the longitudinal elements are covered and maintained. The fronts 17 of supports 23 have an incline which is adapted to the angle of the longitudinal elements, in order to allow a high level of earth filling, by which the wall attains additional specific gravity and stability.

Figure 11:
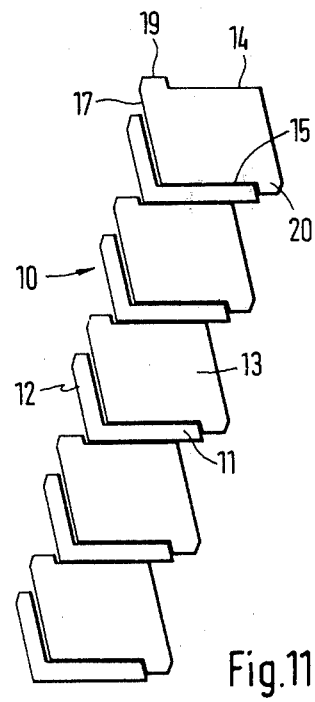
FIG. 11 shows a side view of a retaining wall with form-locking anchoring by projections from the supports.

In the embodiment in FIG. 11, support 13 passes beyond surfaces 14, 15 by means of a projection 19 or 20, whereby the bottom projection 20 carries the force of the slope working horizontally on the support onto base plate 11 of longitudinal element 10, while the top projection 19 receives the horizontal forces from the longitudinal elements lying thereon on the basis of the slope stress forces. Front 17 of support 13 can be at a small distance from parapet part 12, so that the parapet is not loaded and needs no reinforcement. Instead of the symmetrical form of support 13 as shown in FIG. 11, bottom projection 20 can be deleted, so that bottom mounting surface 15 is flat throughout. In this case, support 13 is provided once again with a front recess 16, into which is inserted the suitably short base plate 11 of the longitudinal element. This embodiment can advantageously by higher with retaining walls where the friction lock between support elements lying one over the other does not suffice to support the slope stress forces.

Figure 14:
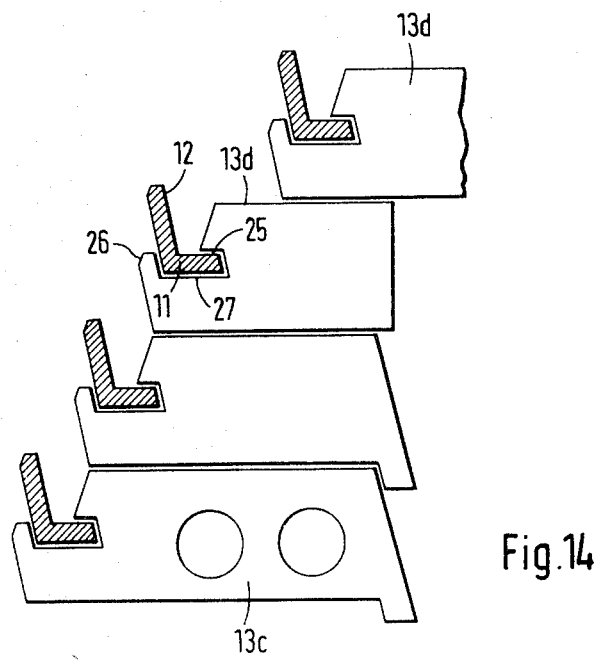
FIG. 14 shows a vertical cross section through a retaining wall of which the longitudinal elements are inserted in form-locking recesses of the supports.

Similar conditions exist with a slope retainer as in FIG. 14, where the bottom supports 13c which can mostly heavily stressed over longitudinal elements 10 by slope stress forces have projections 20 downward at the rear, covering and maintaining support element 13c lying thereunder. Since smaller stresses occur, supports 13d are used with mounting surfaces 15 or 14 passing all the way along the member and being entirely flat. Higher support elements can include recesses 30 as shown in FIG. 14, to economize on weight and material.

In order to absorb larger slope forces, e.g. with a higher retaining wall or with use of longer longitudinal elements 10 or larger spaces between bulkheads, as shown in FIG. 14, recesses 25 are provided in front of supports 13c, 13d, in which base plate 11 of the longitudinal element can be inserted. Recesses 25 are bordered at the front by flanges 26, over which the horizontal slope stress forces working on longitudinal element 12 are consigned back to the stack of support elements, so long as they are not already transmitted through the friction joint between base plate 11 and mounting surface 27 into recess 25 found thereunder. The size of recesses 25 and the height of flanges 26 are so determined that longitudinal elements 10 can be inserted from above comfortably with slight canting. These support elements simplify the mounting of long walls.

Figure 15:
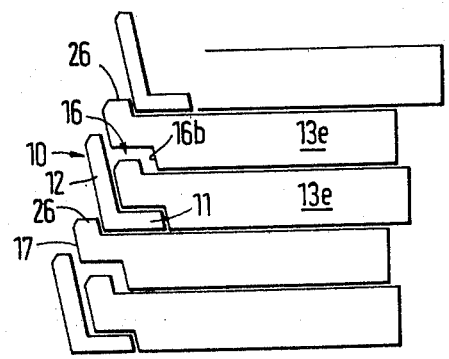
FIG. 15 shows a vertical cross section through a steep retaining wall with use of another embodiment of supports.

The lower support 13e of FIG. 15 is provided with a front flange 26, which is staggered in projection over the upper mounting surface 14 and serves as front abutment to transmit the horizontal slope stress forces working on longitudinal elements 12 to the stack of support elements. Supports 13e also include a bottom recess 16 which is open at the front, so that the same mounting possibilities exist for these supports as are described above in relation to supports 13a, b, in FIG. 3. Supports 13e include an inclined front surface 17, in which is found the bottom recess 16 and to which the flange 26 is joined in its upward thrust. The retaining wall shown in FIG. 15 is of the maximum steepness attainable with the aid of support elements 13e, if two elements 13e are provided as spacers between each planter level. A greater vertical spacing is not advantageous, because the longitudinal elements 12 can thereby be loaded unduly heavily by the slope pressure.

Figure 16:
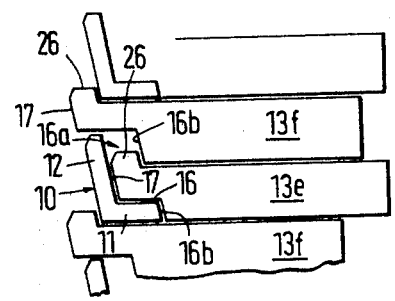
FIG. 16 shows a side view of support elements similar to FIG. 15 for vertical walls.

In order to also be able to construct vertical retaining walls as in FIG. 15, using supports with a front flange 26 and with a bottom support 13f as in FIG. 16, a recess 16a at the bottom and opened at the front is so enlarged that support 13f projects out forward with its flange 26 over parapet element 12 of the longitudinal element and is vertically aligned with the next lower support 13f. Between two support elements 13f is found a support element 13e, of which the bottom recess 16 is of such a size as to only cover base plate 11 and to serve as tilt stabilizer for longitudinal elements 10. The slope forces working on the longitudinal elements, particularly the horizontal, are transmitted over flanges 26 of supports 13e and conducted further back into the stack of support elements, whereby the main part of the force transmission is accomplished by the friction joint between top and bottom mounting surfaces 14 or 15, and any remaining part through the vertical clearance surfaces 16c, and from there through base plate 11 of the next lower element and from there into a flange 26.

Support elements 13f with top flanges as in FIG. 16 form a supplement for supports 13e as in FIG. 15, if vertical walls of great height and thus greater slope forces are erected.

The support elements basically have the function of serving as spacers for the planter levels; they also have the purpose of introducing the earth forces working on the individual levels on the longitudinal elements over the support element stack into the ground or the foundation 28, as in FIGS. 12 and 13. Parapet parts 12 of the longitudinal elements have no contact with front surfaces 17 lying behind them, and therefore do not serve for force transmission and therefore do not need to be reinforced. With the system of the supports and their configuration, longitudinal elements 10 need only be configured for their strength and the specific gravity and the relatively low weight of the ground at one level. Furthermore, the support elements provide the length compensation between the longitudinal elements.

I claim:

1. A structural element system for the erection of plant accommodating, slope retaining walls comprising
    (a) a plurality of substantially L-shaped longitudinal elements arranged in multi-level relationship having a horizontally extending base plate and an upwardly extending parapet forming the front of the wall and providing plant growth medium support surfaces, and
    (b) a plurality of section support elements acting as vertical partitions along said longitudinal elements, extending horizontally in a direction perpendicular to the direction of said longitudinal elements and extending into the slope to be retained,
    (c) said section support elements having upper and lower mounting surfaces adapted to be stacked one upon the other,
    (d) each of said section support elements being provided with a recess which is open to the front, into which the base plate of the longitudinal elements extends, the longitudinal elements being supported by said support elements, whereby the shearing forces of the earth slope along the wall are sectioned by the vertical partitions and by the base plates of said longitudinal elements,
    (e) each of said section support elements being further provided with a front flange extending from said section support element forwardly of said parapet and adjacent the recess for transmitting the horizontal slope stresses exerted on said longitudinal elements back to said section support elements.

2. A structural element system as set out in claim 1, wherein
    (a) the recess in each of said support elements is in the lower mounting surface.

3. A structural element system as set out in claim 1, wherein
    (a) the recess in each of said support elements is intermediate the height thereof.

4. A structural element system as set out in claims 1 or 2, wherein (a) each of said front flanges projects forwardly above the lower mounting surface of said support elements, on the forward edge of which flange is mounted the base plate of said longitudinal element.

5. A structural element system as set out in claim 1, wherein
   (a) said base plate is shorter than said parapet of the longitudinal element, the base plate and parapet forming an angle in the range of approximately 70° to 110°.

6. A structural element system as set out in claims 1 or 2, wherein
   (a) the front surface of said support elements are inclined at an angle corresponding to the angle at which said parapet is inclined.

7. A structural element system as set out in claims 1 or 2, wherein
   (a) the base plates of said longitudinal elements lie within the recesses of the section support elements in spaced relation to that part of the support elements defining the upper limit of the recess, and the said parapet is adjacent, but spaced from, the front surface of said support element.

8. A structural element system as set out in claim 7, wherein
   (a) the bottom recess of said support element is higher than said base plate and is shorter in length than base plate between its rearside and the back of said parapet.

9. A structural element system as set out in claims 1 or 2, wherein
   (a) the height of said support elements is less than that of said parapet.

10. A structural element system as set out in claims 8, wherein
    (a) the front bottom recess of each of said support elements is of such dimensions that the wall of the support element defining the rear limit of the recess is above the upstanding flange of the support element lying thereunder, and the portion of the support element over the recess is above said parapet of the longitudinal element lying thereunder, whereby a vertical wall is created.

11. A structural element system as set out in claim 3, wherein
    (a) the recess in each of said support elements is midway of the height thereof, providing a mounting surface for the base plate of said longitudinal element, and
    (b) a front flange extending upwardly from said mounting surface adjacent the recess.

12. A structural element system as set out in claims 1 or 3, wherein
    (a) said support elements are provided with transverse openings for economy of weight and material.

13. A structural element system as set out in claim 1 with the addition of
    (a) a foundation,
    (b) said support elements being stacked on said foundation one above the other, thereby forming transverse walls extending into the earth of the slope to be shored, so that the slope stress forces in the space between adjacent stacks of support elements are absorbed in increments over the length of said longitudinal elements and transmitted through the support elements to said foundation and into the earth.

14. A structural element system as set out in claim 1, wherein
    (a) the longitudinal elements extending between adjacent support element stacks are in staggered contact with its stack of support elements with respect to the other longitudinal elements which extend in the longitudinal direction of the wall between said support element stacks, and said longitudinal elements overlap in the area of each of said support element stacks.

15. A structural element system as set out in claim 1, wherein
    (a) the distance between the adjacent support element stacks is essentially less than the length of said longitudinal elements resting on said support elements.

* * * * *